May 29, 1951   L. J. KOCI   2,555,273
RADIATION PYROMETER
Filed Nov. 29, 1946   4 Sheets-Sheet 2
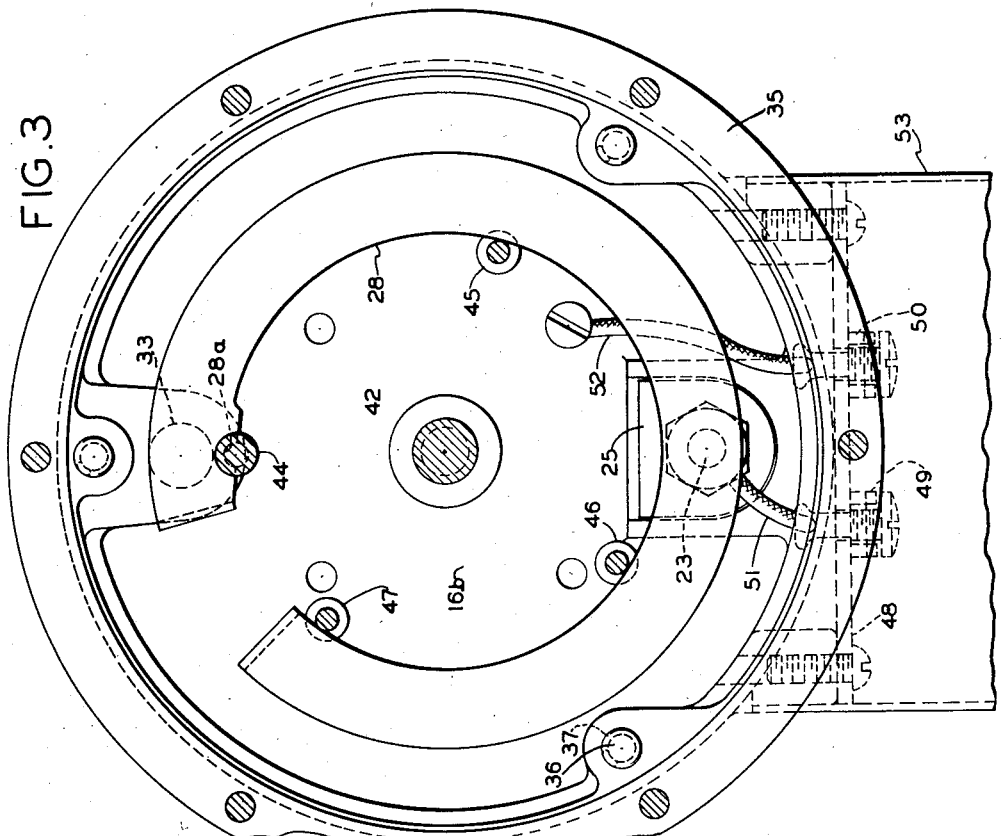
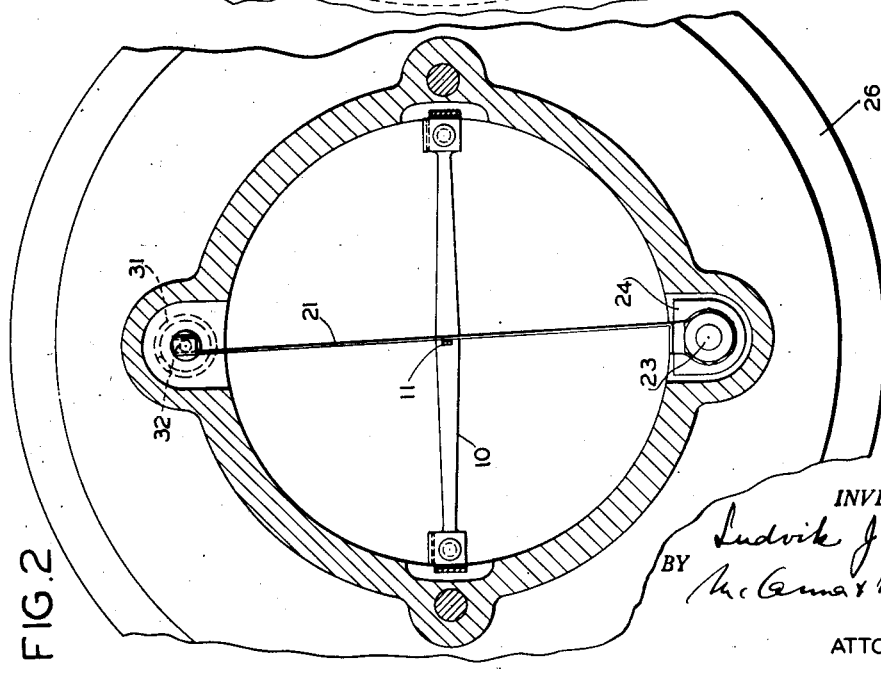
INVENTOR.
Ludvik J. Koci
BY McKenna & Horshack
ATTORNEYS.

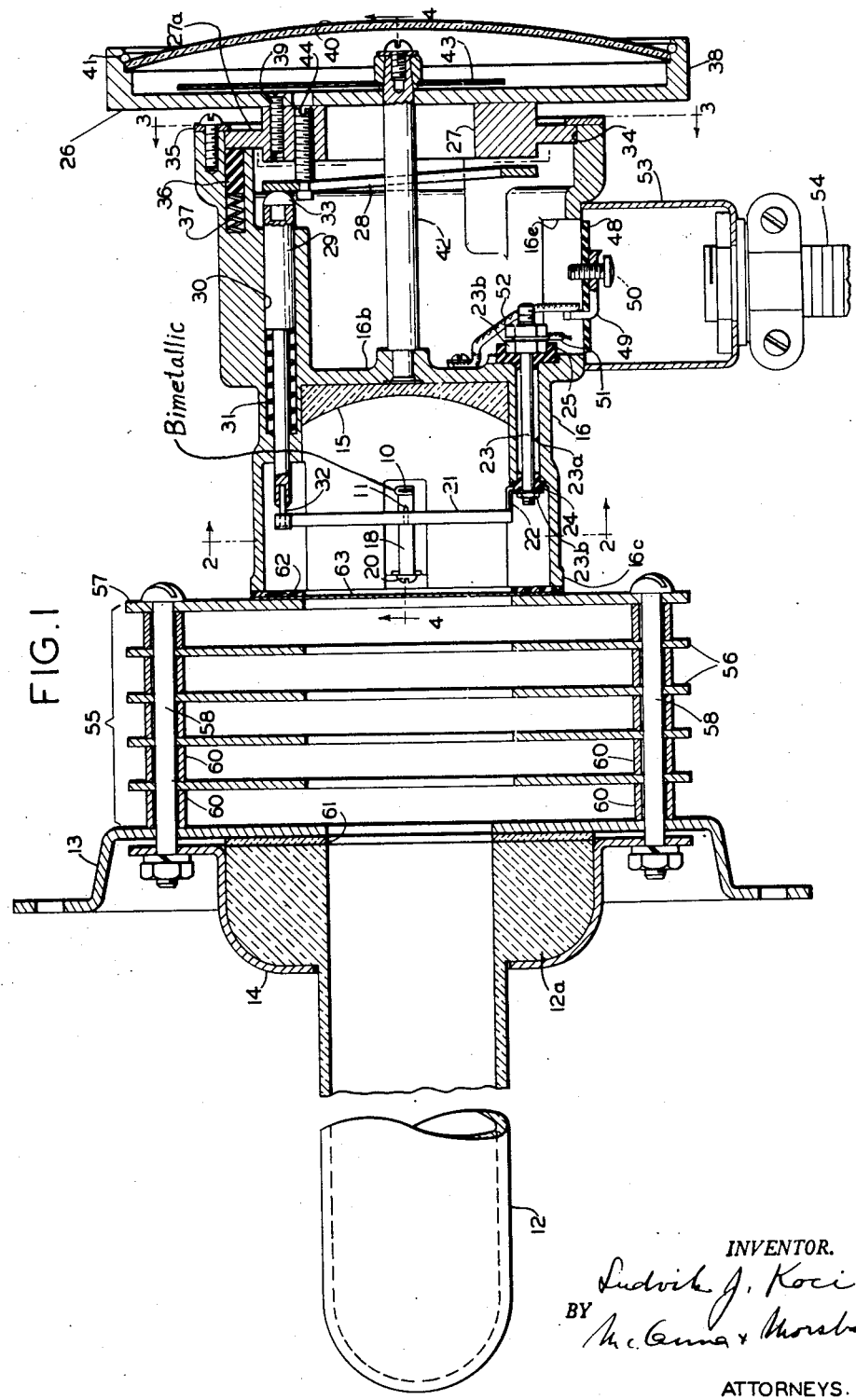

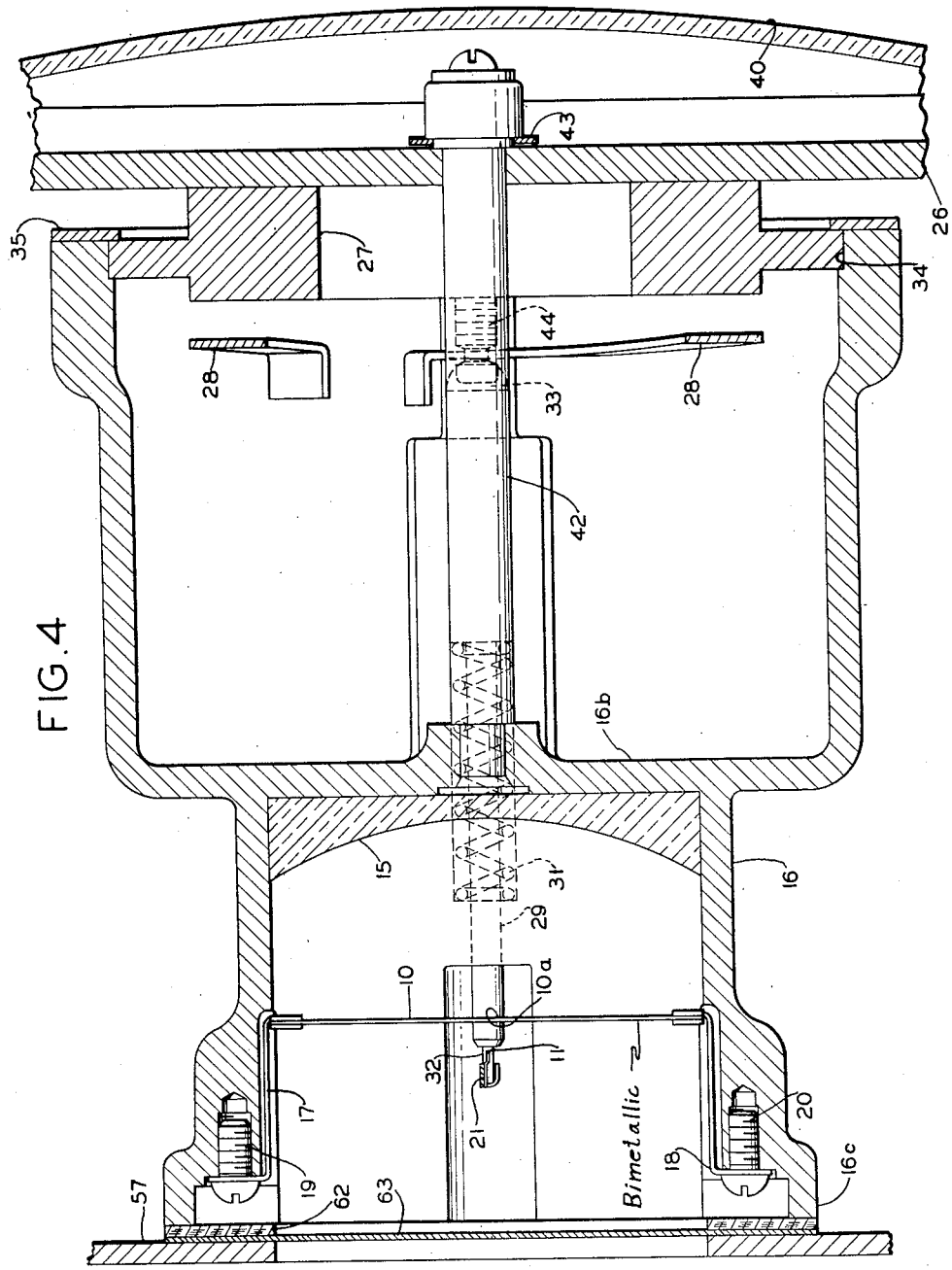

May 29, 1951          L. J. KOCI          2,555,273
RADIATION PYROMETER
Filed Nov. 29, 1946          4 Sheets-Sheet 4
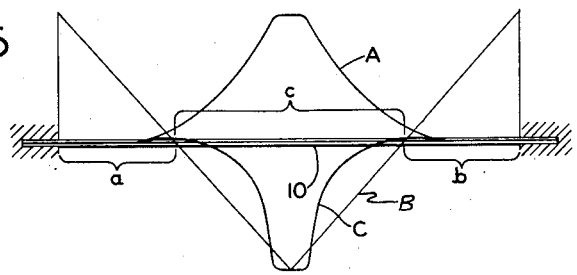
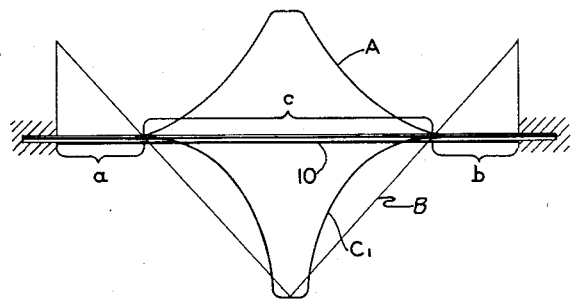
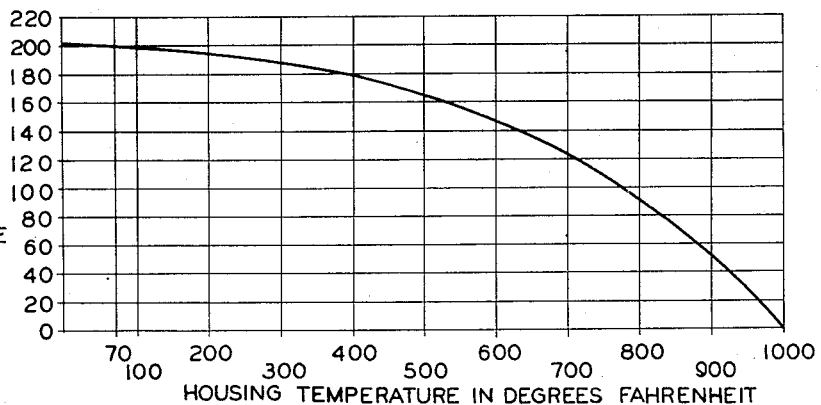
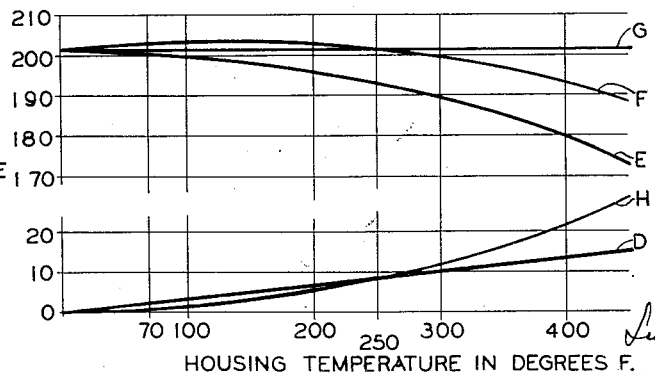
INVENTOR.
Ludvik J. Koci
BY
ATTORNEYS.

Patented May 29, 1951

2,555,273

UNITED STATES PATENT OFFICE 2,555,273

RADIATION PYROMETER

Ludvik J. Koci, Riverside, Ill., assignor to Sunbeam Corporation, Chicago, Ill., a corporation of Illinois Application November 29, 1946, Serial No. 713,158

16 Claims. (Cl. 200—138)

The present invention relates to radiation pyrometers of the character employed to measure furnace temperatures and the like, and more particularly to improvements in pyrometers utilizing a thermally deformable element as the radiant heat responsive element.

In general, radiation pyrometers are of two different types. The first type, and by far the most widely used, is that in which a thermoelectric generator, i. e., a thermocouple or thermopile, is employed as the radiant heat responsive element. This type of pyrometer is exemplified by the structure shown in Harrison Patent No. 2,357,193. Devices of this type are open to several objections including low efficiency in converting the radiant heat into work which is utilized to produce the desired temperature indication and relatively large errors in indication produced by unavoidable and uncontrolled variations in the temperature of the thermocouple cold junctions. The last mentioned difficulty, which is perhaps the most important, arises from the fact that in any thermoelectric generator of the type mentioned, the magnitude of the generated potential is determined by the difference between the hot and cold junctions of the generator, and while it is a comparatively simple matter to employ heat radiation in elevating the temperature of the hot junction of the generator to a value accurately representative of the heat source temperature, it is exceedingly difficult to hold the cold junction temperature constant. Thus, the cold junction of the generator is usually heat coupled to the pyrometer housing and assumes the temperature of this housing. The housing temperature, however, may vary within rather wide limits, due to ambient temperature changes, changes in the amount of heat conducted to the housing from the heat source, and other factors. Such variations in cold junction temperature are non-related to the temperature of the source, and obviously cause errors in the indicated source temperature, which errors become quite large, i. e., of the order of ten per cent or more, when the difference between the source and housing temperatures is relatively small. Various attempts have been made to solve this problem by providing auxiliary facilities for holding the housing temperature constant. Other attempts at solving this problem have proceeded in the direction of compensation, i. e., permitting the pyrometer housing temperature to vary and providing auxiliary facilities for preventing such temperature variations from substantially affecting the magnitude of the generated potential. All such expedients have failed to obviate the problem in full. Moreover, if at all effective, such expedients add materially to the pyrometer cost and to the cost of maintenance and repair.

Pyrometers of the second class, i. e., those employing thermally deformable thermostatic strips as the radiant heat responsive elements, and exemplified by the structure shown in Keeler Patent No. 2,349,436, granted May 23, 1944, have not been widely used since, in general, they are less accurate than pyrometers of the first class. The lack of accuracy in a pyrometer of this type is in part attributable to the difficulty noted above, i. e., that of accurately compensating the device against responding to changes in the temperature of the pyrometer housing. A second, and perhaps more important reason for lack of accuracy in pyrometers of the second class, is the difficulty encountered in obtaining a response, i. e., deflection of the thermostatic strip (assuming the pyrometer housing temperature to be constant) which is accurately representative of the heat source temperature. This is due to the fact that in practically all such devices the deflection obtained is a function of the temperature of the strip as a whole and is not dependent upon the production of a temperature gradient along the strip, due to the lack of radiant energy concentration on a small area of the strip, and to the further difficulty involved in producing an overall strip temperature which is accurately representative of the heat source temperature. Moreover, in the usual device of this character the deflectable thermostatic strip has a natural vibratory frequency which is relatively low such that a false response may be obtained when the device is subjected to extraneous vibratory forces having frequencies of a low order of magnitude.

It is an object of the present invention, therefore, to provide an improved radiation pyrometer in which all of above difficulties, characterizing the prior art arrangements, are substantially completely obviated.

More specifically, it is an object of the invention to provide a radiation pyrometer of relatively low cost which over long use periods is positive and reliable in its operation to measure accurately the temperature of a heat source.

It is another object of the invention to provide a radiation pyrometer capable of measuring temperatures within a wide temperature range in which the response of the radiant heat responsive element is not appreciably affected by variations in the temperature of the pyrometer housing even though this temperature closely approaches the heat source temperature.

It is a further object of the invention to provide a radiation pyrometer of the character described which may be easily and accurately adjusted to indicate different heat source temperatures over a wide range and may be readily calibrated for accuracy of indication over the entire temperature range.

It is yet another object of the invention to provide a circuit control device of rugged construction in which improved and exceedingly accurate facilities are provided for adjusting one of the circuit control contacts relative to the other over a predetermined range of adjustment, and for calibrating the adjustment over the entire range to conform to a desired pattern.

The invention, both as to its organization and method of operation, together with further objects and advantages thereof, will best be understood by reference to the following specification taken in connection with the accompanying drawings, in which:

Fig. 1 is a side view in full section illustrating an improved radiation pyrometer characterized by the features of the present invention;

Fig. 2 is a sectional view taken along the lines 2—2 in Fig. 1;

Fig. 3 is an end sectional view taken along the lines 3—3 in Fig. 1;

Fig. 4 is an enlarged fragmentary sectional view taken along the lines 4—4 in Fig. 1; and Figs. 5, 6, 7 and 8 are curves useful in facilitating an understanding of the present invention.

Referring now to the drawings, the present improved pyrometer is there illustrated as comprising a radiant heat responsive element in the form of a thermally deformable bi-metallic strip 10 which is supported at its ends within a hollow housing member 16 by means of elongated and resilient supporting elements 17 and 18. The strip 10 may be of the commercial type known as Hiheat 47 manufactured by H. A. Wilson and Company of Newark, New Jersey. It is preferably made as thin as possible and may have the following physical characteristics:

|  | Inches |
|---|---|
| Length | 1¾ |
| Width at ends | .086 |
| Width at middle | .096 |
| Thickness | .005 |

The supporting elements 17 and 18 are provided with end portions clampingly embracing the ends of the strip 10 to restrain the embraced ends of the strip against lateral deflection and at least partially restrain these end portions against angular deflection. They extend along the inner wall of the housing member 16 and are anchored to the stepped left end portion of this housing member by means of clamping screws 19 and 20. In addition to supporting the strip 10, the supporting elements may also be used to stress the strip longitudinally in the manner and for the purpose described below. The center portion 10a of the thermostatic strip 10 is arranged to coact with an adjustable contact 11 carried by a supporting bar 21 to control an indicating or control circuit in accordance with deflection of the thermostatic strip mid-portion longitudinally of the housing member 16. Deflection of the thermostatic strip mid-portion is effected in the manner more fully explained below by focusing radiant heat upon the low coefficient of expansion side of the strip mid-portion, i. e., upon the side thereof opposite the contact point 10a. To this end, a mirror 15 is mounted within the housing member 16 at a position along the length thereof such that the thermostatic strip 10 intersects the focal point thereof when the strip is unheated. This mirror, which preferably is formed of glass, is of the same circumferential dimension as the bore of the housing member and is cemented to a transversely extending wall 16b of the housing member. Preferably the ground reflecting surface of the mirror is parabolic in contour, but may be spherical and is gold plated or otherwise surfaced to have high efficiency in radiant heat reflection. To facilitate absorption of heat energy at the strip mid-portion, the surface of this strip portion facing the mirror 15 is preferably coated with an heat absorbing material, such, for example, as lamp black. All other surfaces of the strip are preferably highly polished to minimize heat absorption at points along the strip other than the mid-portion.

Radiant heat is transmitted to the reflecting surface of the mirror 15 for reflection back to the mid-portion of the thermostatic strip 10 by means of a ceramic target tube 12 which is adapted to be projected within the heat source zone, i. e., into the flame or point of maximum temperature within the combustion chamber of an industrial furnace or the like. As is well known, ceramic material, such for example, as porcelain has a high coefficient of heat emissivity, which accounts for the use of a target tube 12 constructed of this material to transmit radiant heat to the mirrored surface of the mirror 15. At its outer end this tube is provided with a bulbous portion 12a embraced by a clamping ring 14 which is utilized to mount the tube upon a cup-shaped supporting member 13. This supporting member may be used to mount the pyrometer assembly upon the wall of a furnace, the temperature of which is to be indicated by the pyrometer.

In order to minimize heat conduction from the furnace walls and the target tube to the housing member 16, a multiple disc heat barrier indicated generally at 55 is interposed between this housing member and the mounting member 13. This barrier is made up of a plurality of centrally apertured heat radiating discs 56 and a correspondingly apertured end disc 57 which are held in spaced apart relationship longitudinally of the tube 12 and the housing member 16 by means of spacing sleeves 60. The described components of the heat barrier 55 and the target tube clamping ring 14 are held in assembled relationship upon the member 13 by means of assembly bolts 58 which extend through registering openings in the parts 13, 14, 56 and 57 and clamp the bulbous end portion 12a of the target tube against one side of the member 13. In order further to reduce heat transfer from the target tube 12 to the housing member 16, a layer of asbestos heat insulating material 61 is interposed between the adjacent surface of the target tube and the member 13. The radiant heat developed within the ceramic target tube 12 is transmitted to the mirrored surface of the mirror 15 for reflection upon the central portion of the strip 10 through the central apertures of the discs 56 and 57, and a dust excluding window 63. More specifically, the window 63 is comprised of mica or quartz, capable of transmitting the radiant heat to the mirror 15, and is clamped between the plate 57 and the end of the housing member 16 with a cork washer 62 interposed therebetween. Any suitable clamping facilities may be employed to clamp the left end of the housing member 16 against the plate 57.

Referring now more particularly to the mechanism provided within the housing member 16, the supporting bar 21 is provided at its lower end, as viewed in Fig. 1 of the drawings, with an integral resilient mounting portion 22 employed in anchoring the lower end of the bar. This mounting portion is electrically and mechanically connected to a bolt 23 which extends through an enlarged opening 23a extending longitudinally through the wall of the housing member 16 and is insulated from the housing member by means of insulating caps 24 and 25. The head of the bolt 23 is drawn tightly against the insulating cap 24 with the mounting portion 22 of the supporting bar 21 clamped therebetween by means of clamping nuts 23b threaded along the opposed end of the bolt to engage the cap 25. This bolt acts electrically to connect the bar 21 and contact 11 with a terminal assembly 49 carried by an insulating terminal plate 48 which covers an aperture 16e in the wall of the housing member and is mounted upon the housing member in the manner shown in Fig. 3 of the drawings. This plate also carries a second terminal screw assembly 50 connected by means of a conductor 52 to the housing member and thence to the thermostatic strip 10, so that the cooperating contact points 10a and 11 are effectively connected in series between the two terminal screw assemblies. Circuit connections may be made to the two terminal assemblies through a conduit 54 which terminates at a conduit box 53 fixedly supported upon the wall of the housing member 16 to cover the terminal plate 48.

For the purpose of adjusting the contact 11 toward and away from the contact point 10a located at the mid-point of the thermostatic strip 10, thereby to vary the measured temperature at which the two named elements are engaged, adjusting facilities comprising camming means in the form of a deformable camming element 28 and a plunger-like cam follower element 29 are provided for moving the upper end of the bar 21 back and forth longitudinally of the housing member 16. More particularly, the plunger 29 is slidably supported within a bore 30 formed in the wall of the housing member 16 and is provided at its right end with a cap 33 biased to engage the camming element 28 by means of a coil spring 31 disposed within the bore hole 30 and embracing the small diameter section of the plunger. At its left end the cam follower plunger 29 carries an insualtor pin 32 which is flexibly connected to the upper end of the contact supporting bar 21. This pin, and the insulating caps 24 and 25, serve electrically to insulate the contact 11 from the housing member 16. The deformable camming element 28 is mounted for rotation with a rotatable adjusting and indicating head indicated generally at 26. This head is comprised of a supporting member 27 having a bearing flange 27a which is rotatably seated within the stepped right end of the housing member 16. The member 27 is held in this position by means of a bearing disc 35 which is screw mounted upon the right end of the housing member. In order to prevent inadvertent rotation of the head 26, a friction plunger 36 is provided which is slidably positioned within a hole drilled inwardly from the right end of the housing member. A coil spring 37 also disposed within the bore hole to react against the plunger 36 functions to urge the right end of the plunger into frictional engagement with the bearing flange 27a of the supporting member 27. As best shown in Fig. 3 of the drawings, the deformable camming element 28 is of ring shaped configuration and is adjustably mounted upon the supporting member 27 by means of four screws 44, 45, 46 and 47 threaded through the supporting member 27. At their inner ends these screws are provided with annular circumferential slots within which the inner edge of the deformable element 28 is received. More specifically, the end slots of the three screws 45, 46 and 47 directly receive the inner edge of the element 28. To prevent rotation of this element relative to the supporting member 27, the end core of the adjusting screw 44 is interlocked with a recess 28a formed at the inner edge of the element 28. With the described mounting arrangement, lateral deformation of the camming element 28 to change the amount of camming action produced at any point along the flat camming surface provided at the inner side thereof may be obtained by suitable adjustment of the four screws 44, 45, 46 and 47 relative to the supporting member 27.

This supporting member also carries a finger dial 38 of cup-shaped configuration, which is mounted upon the member 27 by means of screws 39 and the sides of which are internally stepped to provide a shoulder against which a dished transparent dial face 40 may be seated. The rim of this dial face is held in seating engagement with the described shoulder by means of a snap ring 41 seated within a depression formed around the side wall of the cup-shaped dial 38 at the inner side thereof.

For the purpose of indicating, in terms of measured temperature, the position to which the contact 11 is adjusted relative to the contact point 10 in response to rotation of the dial 38, indicating means are provided which comprise a stationary pointer 43 arranged to coact with a scale plate or inscribed scale provided within the dial 38 along the bottom wall thereof. The stationary pointer 43 is fixedly mounted upon the projecting end of a stud 42 which extends through an opening formed at the center of the bottom wall of the dial 38. This stud is fixedly mounted upon the transversely extending part 16b of the housing member 16 in the manner illustrated in Fig. 1 of the drawings.

In order to explain the manner in which the lateral deflection response of the mid-portion of the thermostatic strip 10 is rendered entirely independent of the temperature of the housing member 16 and solely responsive to the amount of radiant heat focused thereon, and hence the temperature of this strip portion, reference is made to the illustrative graphs shown in Figs. 5, 6, 7 and 8 of the drawings. The graph shown in Fig. 5 illustrates certain response characteristics of a bi-metallic thermostatic strip 10 of uniform cross-sectional dimension throughout its length and having its ends wholly restrained against both angular and lateral deflection and its high coefficient of expansion side facing down. With the end portions of the strip thus supported, heating of the strip at various points along the length thereof produces deflections of the strip mid-portion in opposite directions. Thus, if the strip is heated locally at any point within the end zones a and b thereof, as shown in Fig. 5 of the drawings, the resulting forces developed in the strip tend to deflect the mid-portion of the strip upwardly from the illustrated position thereof. On the other hand, if the strip is heated locally at a point within its center zone c, forces are developed in the strip which tend to move the mid-portion thereof downward. Specifically, the response of the mid-portion of the strip to a given temperature rise at any point along the strip may be represented by the curve B, the various points of which indicate the direction, as well as the magnitude of mid-point deflection of the strip produced for a given increment of temperature change applied to that portion of the strip associated with any particular ordinate of the curve B. The net sum or integral of the forces tending to produce lateral deflection of the strip mid-point is obviously equal to the integral of the product of the ordinates of curve B and the temperature change associated therewith. From an inspection of this curve, it will be apparent that for a strip of unvarying cross-section and so long as the strip is of uniform temperature, the integral of the forces tending to produce downward deflection of the strip mid-point, as represented by the area beneath the portion c of the curve B, exactly equals the integral of the forces tending to produce upward deflection of the strip mid-point, as represented by the combined areas beneath the parts a and b of the curve B. Hence, so long as the temperature of the strip is varied uniformly throughout its length, as, for example, by ambient temperature changes in the air or other media surrounding the strip, no deflection of the strip mid-portion occurs in either direction. In other words, by providing a strip 10 of uniform cross-sectional configuration throughout its length, and by rigidly anchoring the end portions of this strip against both angular and lateral movement, a thermostatic element is provided which is fully compensated against any appreciable response as a result of ambient temperature changes.

To consider the manner in which lateral movement of the strip mid-portion is produced in response to the temperature gradient set up longitudinally of the strip through the action of the radiant heat focused thereon by the reflecting surface of the mirror 15, it is pointed out above that this temperature gradient may be generally represented by the curve A which indicates that the temperature of the mid-portion c of the strip is substantially higher than that of the end portions a and b. The particular configuration of this curve will, of course, depend upon several factors, including the design of the described structure for focusing radiant heat on the strip mid-portion, the surface finish of the strip, the specific heat and conductivity of the strip material, and the cross-sectional dimensions of the strip. In the theoretical case where the strip can be considered to be relatively long, where heat input is concentrated at a single point at the center and where it may be assumed that heat loss from any particular portion of the strip to the surroundings is proportional to difference in temperature between such portion and the surrounding, this curve would be a true exponential curve, i. e., of the type $T=T_0\epsilon^{-kx}$ (where $x$ represents the distance removed from the center of the strip toward either end thereof), in the final steady state equilibrium condition. However, even in this case, the temperature distribution during the important transient condition, where heat capacity must be taken into account, cannot be represented by such a relatively simple algebraic expression. The important fact to observe, however, is that substantially no temperature gradient is produced along the portions a and b of the strip, whereas a high temperature gradient is present in the mid-portion c of the strip. By reference to the curve B, it will also be apparent that the temperature gradient resulting from focusing radiant heat energy upon the strip mid-portion tends to produce downward deflection of the strip mid-portion. The total force tending to produce downward deflection of the strip mid-portion is equal to the integral of the product curve C, which is obtained by multiplying the values represented by the curves A and B at the various points therealong. This product curve is of negligible value over the portions a and b of the strip where no appreciable temperature increase occurs. It is, however, of appreciable value in the mid-region c of the strip wherein the strip temperature gradient is appreciable.

From the above explanation, it will be apparent that for a thermostatic strip of uniform cross-sectional configuration having its ends restrained against both angular and lateral motion, the lateral deflection of the strip mid-portion is a function of the temperature gradient along the length of the strip and specifically the gradient between the central portion of the strip and the end portions thereof. Thus, a thermostatic strip of this form produces a result substantially equivalent to that obtained by a pyrometer in which a thermocouple or a thermopile is employed as the radiant heat responsive element in that such a thermostat is characterized by a mid-point deflection response exactly proportional to the temperature difference between the middle and end portions of the strip. Moreover, and as previously pointed out, a pyrometer of this type is subject to considerable error in indication if the housing of the device is permitted to rise above temperature values in excess of 150 degrees Fahrenheit when used to indicate temperatures of only a few hundred degrees. The reason why this is true is well illustrated by the curves shown in Fig. 6 of the drawings. As there shown, if a given heat source having a temperature of 1000° F. is radiating to another object having any temperature ranging from 75° F. to 1000° F., the net power radiated to the object is a function of the temperature differential between the source and the object. Thus, 200 milli-watts will be transferred when the receiving object is at a temperature of 75° F., slightly less will be transferred when the temperature of the receiving object is increased to 150° F., still less when the receiving object temperature reaches 300° F., and finally no heat transfer will occur when the receiving object is at the same temperature as the source. If the receiving object is now considered to be a radiation pyrometer, it is apparent that as the temperature of the pyrometer is permitted to rise from 75° F. to 150° F. (due to heat transfer thereto through the surrounding media) its response is reduced one and one half per cent. This represents only a small percentage error in indicated source temperature, but if the pyrometer temperature is permitted to rise to 300° F. the error becomes six per cent which is substantial. If now the source temperature is only 400° F. instead of 1000° F., the heat transfer is represented by the curve of Fig. 6. As shown by this curve, if the temperature of the pyrometer is increased to 150° F., the decrease in heat transfer becomes such as to produce an error of two per cent in the indicated temperature. In the examples considered, the temperature rise of the pyrometer housing is considerably more severe than normally encountered in service. Also, the temperature rise of the housing when absorbing radiation energy from a 400° F. source is considerably less than when absorbing radiant energy from a 1000° F. source. On the other hand, the hot junction of the pyrometer thermocouple is always somewhat higher than that of the housing and since in any condition of radiant heat transfer it is this temperature which must be considered instead of the actual housing temperature, the actual errors are somewhat greater than those indicated. Thus by analogy it is apparent that when a thermostatic strip 10 of uniform cross section throughout its length is used as the radiant energy responsive element, appreciable errors may be expected in the indicated source temperature, when the temperature differential between the strip mid-portion and its end portions becomes relatively small.

To obviate the above difficulty and obtain a thermostatic strip mid-point deflection response which is solely a function of the temperature of this strip portion, a strip 10 is employed which, as best shown in Fig. 2 of the drawings, is tapered or of decreasing width from its mid-point to the ends thereof. As shown in Fig. 7 which graphically illustrates the characteristics A, B and C for the strip 10 of decreasing width, the effect of tapering or reducing the width of the strip from its mid-portion toward its end portions is to reduce the tendency to produce upward deflection of the strip mid-portion when the end zones a and b of the strip are increased in temperature, to decrease the lengths of these zones, and to increase the tendency to produce downward deflection of the strip mid-portion when any point along the increased center portion c of the strip is increased in temperature. Obviously, the area beneath the portion c of the curve B is greater than the combined areas beneath the portions a and b of the curve. It follows, therefore, that a uniform temperature change longitudinally of the strip will produce a resulting deflection of the strip mid-portion. Thus, an increase in temperature throughout the strip will tend to effect downward deflection of the strip and vice versa.

More specifically, the net effect obtained by tapering the thermostatic strip 10 in the manner just explained is exactly the same as would be obtained by the use of a first strip of uniform width throughout its length, upon which is superimposed the action of a second thermostatic strip tapering from zero width at its ends to a width equal to the difference in width between the wide middle portion of the strip 10 and the narrow end portions of the same strip. For purposes of analysis, the effect of the two superimposed components may be considered separately with the view of obtaining a resultant response of the illustrated strip 10 of graduated width by adding together the effect of the two components. The component thermostatic strip of uniform width, as was pointed out above, has the characteristic of operating strictly on a temperature gradient basis, i. e., the response obtained depends upon the temperature difference between the strip mid-portion and the strip end portions. The second component thermostat, however, responds solely to changes in its overall temperature and is completely non-responsive to temperature gradients along the length thereof. Thus, if the composite thermostat is heated uniformly, a deflection is obtained in the same direction as would result if only the second component is heated and if the composite thermostat is prevented from moving it will react with a force when heated uniformly exactly equal to the force which the second thermostatic component would produce.

From the above explanation it will be apparent that when a thermostat which is wider at the middle than at the ends is embodied in the radiation pyrometer, the component of uniform width acts the same as before to produce strip midpoint deflection in accordance with the intensity of the radiation absorbed by the middle portion of the strip. Further, as the temperature of the housing rises the deflection of the thermostat due to this component will be reduced in the manner illustrated by the curves shown in Figs. 5 and 7 of the drawings. However, as the temperature of the housing rises the second component of the thermostat, i. e., the needlepoint or tapered portion, tends to produce a strip mid-point deflection in the same direction as that resulting from a temperature difference between a hot middle portion and cold end portions of the first or uniform width component. Hence, as the housing rises in temperature while the source remains at the same temperature, the deflection due to the action of the first component of the strip is reduced, but on the other hand the deflection due to the second component of the strip is increased. It thus becomes apparent that by making the middle of the thermostatic strip suitably greater in width than the strip end portions quantitatively effective compensation for wide variations in temperature of the pyrometer housing may be obtained.

Taking another view of the described action and referring to Fig. 8 of the drawings, by making the middle portion of the thermostatic strip slightly wider than the end portions, a thermostatic response represented by the curve D is superimposed upon the characteristic response curve E with the net result indicated by the curve F. If the corrective action is linear, as represented by the curve D, the net response will be slightly curved and accordingly cannot be regarded as exactly compensating for a wide range of housing temperatures unless such net curve manifests itself as a straight horizontal line G. It is theoretically possible to obtain a secondary thermostatic action represented by the curve H which when combined with that represented by the curve E results in essentially a horizontal line by using thermal metal whose activity increases with increase in temperature or by a limited number of other methods. However, the net response as represented by curve F is such an improvement in accuracy over the conventional response as represented by curve E as to result in almost perfect accuracy. For example, where a housing temperature rise from 175° F. to 200° F. introduces an error of three and one half per cent when a conventional thermocouple radiation pyrometer is used or when an equivalent pyrometer using a bimetallic thermostat of uniform width is used, this error is reduced to a figure of less than one half of one per cent when a thermostatic strip of suitable variation in width from the middle towards the ends is used (assuming a source temperature of 1000° F.). Similarly, where an increase in temperature of the housing to 300° F. introduces an error of seven per cent in the first case, this error reduces to less than one half of one per cent where a thermostatic strip of suitable variation in width is used. Thus, the present improved radiation pyrometer represents a distinct improvement over commercially available radiation pyrometers insofar as reducing inaccuracies resulting from variation in housing temperature is concerned.

Another advantage of the present improved structure over both the spiral bimetallic radiation thermostatic pyrometer and that of the thermocouple type pyrometer resides in the greater efficiency of the structure as regards conversion of thermoelectric power into mechanical power. For example, when a radiation thermocouple is used in conjunction with a conventional millivolt meter as an indicator, less than $\frac{1}{10}$ of one per cent of the radiant energy concentrated on the hot junction of the thermocouple is converted into electrical energy, as contrasted with the present improved structure wherein a conversion efficiency of one per cent or more is easily obtained, with the added advantage that the resultant power is already available as mechanical power and hence a supplementary electro-mechanical converter is not required. Such high efficiency of energy conversion results from the fact that essentially all of the radiant energy concentrated by the mirror 15 is absorbed by the middle portion of the thermostatic strip. Radiant energy concentration at the center of the strip to obtain the maximum temperature differential between the strip mid-portion and the strip ends and hence maximum sensitivity, is in marked contrast with conventional thermostatic strip pyrometers wherein the available radiant energy is spread over the entire strip surface with a resultant loss in sensitivity of response. High efficiency of energy conversion also results from the fact that the middle portion of the thermostat is the most active portion as regards deflection in the positive direction. This activity progressively decreases as the ends are approached, reaches a null point at a point approximately half way between the middle and either end, then reverses in thermostatic effect and increases to provide maximum deflection in a negative sense at the extreme ends just adjacent the supports 17 and 18. This graduated and bi-directional thermostatic activity is ideally suited to radiation pyrometer requirements.

A further feature of improvement resides in the provision of a thermostatic strip which is relatively thin and has a blackened middle portion to facilitate radiant energy absorption. With this construction the strip has very small heat capacity and hence is characterized by a very rapid or low lag temperature change response. Further, the strip structure is much less affected by vibration and has a much higher natural mechanical vibration frequency than usually found in conventional thermostatic types of pyrometer structures. Also by adjusting the strip end supports 17 and 18 to provide the proper degree of longitudinal stress within the thermostat at the time of assembly, the strip can be made to snap between its two settings. By imposing somewhat less longitudinal stress on the strip during assembly, it is possible to obtain a marked increase in sensitivity insofar as motion per unit change in radiation intensity is concerned. This last feature affords the possibility of obtaining essentially negligible effect due to the action of any wear of contact points. Thus far the thermostatic strip structure has been described as an essentially straight and unbuckled bimetallic piece rigidly supported at its two ends. Actually, when mounted in the housing 16, which has a different coefficient of expansion than the mean coefficient of longitudinal expansion of the thermostatic strip 10, there is a secondary thermostatic action occasioned by changes in the temperature of the housing. Thus, if the thermostat is replaced by a homogeneous non-thermostatic strip of steel supported in a brass or aluminum housing and both the housing and the strip are cooled equally, the housing will contract more than the steel strip due to the fact that the housing has a higher coefficient of expansion than the steel strip. This would result in the strip being buckled in one of the two directions. Exactly the same action occurs when a strip of bimetal is used in place of a plain steel strip, and further, this action is superimposed upon the main thermostatic action described above. Although this last thermostatic action is very small as compared with the main action its effect cannot be totally disregarded if the device is to have high accuracy.

In accordance with the present invention, the last referred to thermostatic action occasioned by expansion and contraction of the housing member 16 is nullified by supporting the thermostatic strip 10 at the free ends of the elongated resilient supporting elements 17 and 18 to permit expansion and contraction of the housing 16 without appreciably changing the longitudinal stress imposed on the strip 10 by the two resilient supporting strips. It will be understood that these two supporting elements are during assembly deformed away from each other to provide the desired degree of longitudinal stressing of the strip 10. Preferably the elements 17 and 18 and particularly the clamping portions thereof between which the ends of the thermostatic strip 10 are clamped, are of sufficient rigidity positively to restrain the clamped end portions of the strip against both lateral and angular motion. In this regard it is noted that the effect of permitting controlled angular deflection of the thermostatic strip ends is exactly the same as the effect obtained by increasing the degree of taper of the strip between the strip mid-point and its ends insofar as the response characteristic of the strip is concerned. Accordingly, the resilient supporting elements 17 and 18 may, if desired, be constructed to permit an appreciable angular deflection of the strip end portions, which permissible deflection is taken into account in the selection of the degree of taper in the width of the strip. Actually, the desired response characteristic may be obtained by employing a thermostatic strip of uniform width providing the supporting elements 17 and 18 are properly designed to permit the required controlled angular deflection of the strip ends.

From the preceding explanation, it will be understood that the contact point 10a of the strip 10 is only deflected to engage the contact 11 when the temperature of the heat source into which the target tube 12 is projected is elevated to a predetermined value. The temperature at which such contact engagement is produced may, of course, be selected as desired by appropriate adjustment of the contact 11 relative to the contact point 10 in the direction of lateral deflection of the thermostatic strip mid-point. This is accomplished by rotation of the dial 38 relative to the housing member 16. Thus, as this dial is rotated to rotate the camming element 28 therewith, the cam follower plunger 29 is longitudinally moved within the bore 30 to correspondingly position the contact 11 relative to the contact point 10a. Such adjustment of the movable contact 11 is facilitated by the indication provided through coaction of the stationary pointer 43 with temperature scale carried by the dial 38. Thus, after each adjustment of the dial 38 to a new setting, the temperature at which the contact point 10a will be deflected to engage the contact 11 is direction indicated by indexing of the pointer 43 with the temperature scale.

As indicated above, in order to calibrate the device so that the indications provided by the scale and pointer are accurately indicative of the temperatures at which the contact point 10a engages the contact 11 over the entire temperature range which the device is capable of measuring, deformation of the camming element 28 is relied upon. Such deformation may be obtained as desired by suitable screw-driver adjustment of the four screws 44, 45, 46 and 47 to adjustably deform the element 28 and thus change the configuration of its camming surface. In practice, calibration of the instrument at the four points over the temperature range thereof represented by the position of the dial 38 at which the four adjusting screws are respectively opposite the cam follower plunger 29, is sufficient to produce substantially exact calibration of the instrument over the entire temperature range.

While one embodiment of the invention has been described, it will be understood that various modifications may be made therein which are within the true spirit and scope of the invention as defined in the appended claims.

I claim:

1. A radiation pyrometer for producing an effect representative of the temperature of a source of radiant heat, comprising an elongated non-reversed bimetallic strip of decreasing width from its center toward its ends, supporting means for supporting said strip and including provisions for restraining each end portion of said strip against both angular and lateral motion, whereby the lateral motion response of the center portion of said strip is rendered substantially independent of changes in the temperature of said supporting means, focusing means for directing radiant heat derived from said source upon substantially only said center portion of said strip and not substantially exceeding the center one-third of said strip, thereby to produce a lateral motion response of said strip center portion which is directly related to the temperature of said source, and tubular means for transmitting radiant heat energy from said source to said focusing means.

2. A radiation pyrometer for producing an effect representative of the temperature of a source of radiant heat, comprising an elongated non-reversed bimetallic strip, a supporting member having an appreciable temperature coefficient of expansion, supporting means mounted upon said member and engaging said strip at the ends to support said strip from said member, restrain each end portion of the strip against lateral motion, at least partially restrain said strip end portions against angular motion and prevent appreciable change in the longitudinal stressing of said strip in response to expansion and contraction of said member, the cross-sectional dimensions of said strip being so related to the angular motion restraining action of said means that the lateral motion response of an intermediate portion of said strip is substantially independent of changes in the temperature of said supporting member, focusing means for directing radiant heat derived from said source upon substantially only said intermediate portion of said strip, said intermediate portion comprising generally the center one-third of said strip, thereby to produce a lateral motion response of said intermediate strip portion which is directly related to the temperature of said source, and tubular means for transmitting radiant heat energy from said source to said focusing means.

3. A radiation pyrometer for producing an effect representative of the temperature of a source of radiant heat, comprising an elongated non-reversed bimetallic strip, a supporting member having an appreciable temperature coefficient of expansion, resilient supporting elements mounted upon said member and engaging said strip at the ends to support said strip from said member, restrain each end portion of the strip against lateral motion, at least partially restrain said strip end portions against angular motion and prevent appreciable change in the longitudinal stressing of said strip in response to expansion and contraction of said member, the cross-sectional dimensions of said strip being so related to the angular motion restraining action of said resilient supporting elements that the lateral motion response of an intermediate portion of said strip is substantially independent of changes in the temperature of said supporting member, focusing means for directing radiant heat derived from said source upon substantially only said intermediate portion of said strip, said intermediate portion comprising generally the center one-third of said strip, thereby to produce a lateral motion response of said intermediate strip portion which is directly related to the temperature of said source, and tubular means for transmitting radiant heat energy from said source to said focusing means.

4. A radiation pyrometer for producing an effect representative of the temperature of a source of radiant heat, comprising a hollow open ended housing member having an appreciable temperature coefficient of expansion, an elongated bimetallic strip disposed within said member, elongated resilient elements anchored at corresponding ends to said housing member and extending along the inner wall of said member, clamping means connecting the other ends of said elements to the end portions of said strip, whereby said elements restrain said strip end portions against lateral motion, at least partially restrain said strip end portions against angular motion and prevent appreciable change in the longitudinal stressing of said strip in response to expansion and contraction of said member, the cross-sectional dimensions of said strip being so related to the angular motion restraining action of said resilient elements that the lateral motion response of an intermediate portion of said strip is substantially independent of changes in the temperature of said housing member, focusing means for directing radiant heat derived from said source upon said intermediate portion of said strip, thereby to produce a lateral motion response of said intermediate strip portion which is directly related to the temperature of said source, and tubular means for transmitting radiant heat energy from said source to said focusing means.

5. A radiation pyrometer for controlling a circuit in accordance with the temperature of a source of heat, comprising a pair of relatively movable contacts, thermostatic means for producing relative movement of said contacts into and out of engagement, focusing means for directing radiant energy derived from said source upon said thermostatic means, means for limiting the response of said thermostatic means substantially to that effected by said radiant energy, a pair of relatively rotatable members, a resilient deformable camming element carried by one of said members and provided with a camming surface, a cam follower supported by the other of said members for movement by said camming element in response to relative rotation of said members, means responsive to movement of said cam follower for adjustably positioning said contacts relative to each other, and means for adjustably deforming said camming element to change the configuration of said camming surface and thus provide for calibration of the adjustability of said contacts relative to each other.

6. A radiation pyrometer for controlling a circuit in accordance with the temperature of a source of heat, comprising a pair of relatively movable contacts, means for producing relative movement of said contacts into and out of engagement, focusing means for directing radiant energy derived from said source upon said thermostatic means, means for limiting the response of said thermostatic means substantially to that effected by said radiant energy, a pair of relatively rotatable members, a resilient deformable camming element of ring-like configuration and provided with a camming surface, adjusting screws threaded through one of said members and supporting said camming element at spaced points therealong, a cam follower supported by the other of said members for movement by said camming element in response to relative rotation of said members, and means responsive to movement of said cam follower for adjustably positioning said contacts relative to each other, said camming element being adjustably deformable to change the configuration of said camming surface in response to adjustment of said screws, thereby to provide for calibration of the adjustment of said contacts produced in response to given increments of relative movement between said members.

7. A radiation pyrometer for controlling a circuit in accordance with the temperature of a source of heat, comprising a hollow housing member having an open end, a pair of relatively movable contacts disposed within said member, thermostatic means within said member for producing relative movement of said contacts into and out of engagement, focusing means for directing radiant energy derived from said source upon said thermostatic means, means for limiting the response of said thermostatic means substantially to that effected by said radiant energy, an adjusting head rotatably supported by said member at the open end thereof, a resilient deformable camming element of rink-like configuration carried by said head interiorly of said housing and provided with a camming surface, an elongated cam follower slidably supported within the wall of said member for longitudinal movement by said camming element in response to rotation of said head, means responsive to longitudinal movement of said cam follower for adjustably positioning said contacts relative to each other, and means carried by said head for adjustably deforming said camming element to change the configuration of said camming surface and thus provide for calibration of the adjustment of said contacts produced in response to given increments of rotation of said head.

8. A radiation pyrometer for controlling a circuit in accordance with the temperature of a source of heat, comprising a hollow housing member having an open end, a pair of relatively movable contacts disposed within said member, thermostatic means within said member for producing relative movement of said contacts into and out of engagement, focusing means for directing radiant energy derived from said source upon said thermostatic means, means for limiting the response of said thermostatic means substantially to that effected by said radiant energy, an adjusting head rotatably supported by said member at the open end thereof, a resilient deformable camming element of ring-like configuration and provided with a camming surface, adjusting screws threaded through said head and engaging said camming element at spaced points therealong to support said element interiorly of said housing, an elongated cam follower slidably supported within the wall of said member for longitudinal movement by said camming element in response to rotation of said head, and means responsive to longitudinal movement of said cam follower for adjustably positioning said contacts relative to each other, said camming element being adjustably deformable to change the configuration of said camming surface in response to adjustment of said screws, thereby to provide for calibration of the adjustment of said contacts produced in response to given increments of rotary movement of said head.

9. A circuit control device comprising a hollow housing member having an open end and a transversely extending supporting part disposed therein, a pair of relatively movable contacts disposed within said member, means within said member for producing relative movement of said contacts into and out of engagement, an adjusting head rotatably supported by said member at the open end thereof, a resilient deformable camming element of ring-like configuration carried by said head interiorly of said housing and provided with a camming surface, an elongated cam follower slidably supported within the wall of said member for longitudinal movement by said camming element in response to rotation of said head, means responsive to longitudinal movement of said cam follower for adjustably positioning said contacts relative to each other, a supporting rod mounted upon said supporting part of said member and extending through said head, cooperating indicating means respectively carried by said head and said rod for indicating the relative settings of said contacts, and means carried by said head for adjustably deforming said camming element to change the configuration of said camming surface and thus provide for calibration of the adjustment of said contacts produced in response to given increments of rotation of said head.

10. A thermostatic circuit control device comprising a hollow housing having an open end, a thermostatic strip extending transversely of said member interiorly thereof and provided with a contact point adjacent its center, resilient elements supporting said strip at its ends from the walls of said housing, whereby the lateral response of said strip at its center is not substantially influenced by expansion and contraction of said housing member, a contact supporting bar extending transversely of said member interiorly thereof and provided with a second contact cooperable with said contact point, a resilient element supporting said bar at one end from the wall of said housing, and means for adjustably moving the other end of said bar, thereby to adjust the position of said second contact relative to said contact point.

11. A thermostatic circuit control device comprising a hollow housing having an open end, a thermostatic strip extending transversely of said member interiorly thereof and provided with a contact point adjacent its center, resilient elements supporting said strip at its ends from the walls of said housing, whereby the lateral response of said strip at its center is not substantially influenced by expansion and contraction of said housing member, a contact supporting bar extending transversely of said member interiorly thereof and provided with a second contact cooperable with said contact point, a resilient element supporting said bar at one end from the wall of said housing, an adjusting head rotatably supported by said member at the open end thereof, a camming element of ring-like configuration carried by said head interiorly of said housing and provided with a camming surface, and an elongated cam follower slidably supported within the wall of said member for longitudinal movement by said camming element in response to rotation of said head, said cam follower being connected to the other end of said bar to move said other end of said bar during longitudinal movement thereof, whereby the position of said second contact relative to said contact point is changed in response to rotation of said head.

12. A thermostatic circuit control device comprising a hollow housing having an open end, a thermostatic strip extending transversely of said member interiorly thereof and provided with a contact point adjacent its center, resilient elements supporting said strip at its ends from the walls of said housing, whereby the lateral response of said strip at its center is not substantially influenced by expansion and contraction of said housing member, a contact supporting bar extending transversely of said member interiorly thereof and provided with a second contact cooperable with said contact point, a resilient element supporting said bar at one end from the wall of said housing, an adjusting head rotatably supported by said member at the open end thereof, a resilient deformable camming element of ring-like configuration carried by said head interiorly of said housing and provided with a camming surface, an elongated cam follower slidably supported within the wall of said member for longitudinal movement by said camming element in response to rotation of said head, said cam follower being connected to the other end of said bar to move said other end of said bar during longitudinal movement thereof, whereby the position of said second contact relative to said contact point is changed in response to rotation of said head, and means carried by said head for adjustably deforming said camming element to change the configuration of said camming surface and thus provide for calibration of the adjustment of said contacts produced in response to given increments of rotation of said head.

13. A thermostatic circuit control device comprising a hollow housing having an open end, a thermostatic strip extending transversely of said member interiorly thereof and provided with a contact point adjacent its center, resilient elements supporting said strip at its ends from the walls of said housing, whereby the lateral response of said strip at its center is not substantially influenced by expansion and contraction of said housing member, a contact supporting bar extending transversely of said member interiorly thereof and provided with a second contact cooperable with said contact point, a resilient element supporting said bar at one end from the wall of said housing, an adjusting head rotatably supported by said member at the open end thereof, a resilient deformable camming element of ring-like configuration disposed within said housing and provided with a camming surface, adjusting screws threaded through said head and engaging said camming element at spaced points therealong to support said element interiorly of said housing, and an elongated cam follower slidably supported within the wall of said member for longitudinal movement by said camming element in response to rotation of said head, said cam follower being connected to the other end of said bar to move said other end of said bar during longitudinal movement thereof, whereby the position of said second contact relative to said contact point is changed in response to rotation of said head, and said camming element being adjustably deformable to change the configuration of said camming surface in response to adjustment of said screws, thereby to provide for calibration of the adjustment of said contacts produced in response to given increments of rotary movement of said head.

14. A radiation pyrometer for producing an effect representative of the temperature of a source of radiant heat, comprising a single non-reversed bimetallic element adapted to be spaced from said heat source, focusing means for directing radiant energy upon a small intermediate portion of said bimetallic element not substantially exceeding the center one-third of said element, thereby to produce a response of said portion of said bimetallic element, tubular means for transmitting radiant energy from said source to said focusing means, and supporting means including facilities for clamping the end portions of said bimetallic element against both angular and lateral motion, thereby to limit the response of said small portion of said bimetallic element substantially to that effected by the focusing of radiant energy from said source upon said portion of said element.

15. A radiation pyrometer for producing an effect representative of the temperature of a source of radiant heat, comprising a single non-reversed bimetallic element adapted to be spaced from said heat source, focusing means for directing radiant energy upon a small intermediate portion of said bimetallic element not substantially exceeding the center one-third of said element, thereby to produce a response of said portion of said bimetallic element, tubular means for transmitting radiant energy from said source to said focusing means, a heat barrier structure interposed between said tubular means and said bimetallic element to minimize heat conduction from said source to said element, and supporting means including facilities for clamping the end portions of said bimetallic element against both angular and lateral motion, thereby to limit the response of said small portion of said bimetallic element substantially to that effected by the focusing of radiant energy from said source upon said portion of said element.

16. A radiation pyrometer for producing an effect representative of the temperature of a source of radiant heat, comprising an open ended radiant energy transmission tube, a substantially straight non-reversed bimetallic strip extending transversely across the open end of said tube, focusing means aligned with the open end of said tube and farther removed from the open end thereof than said bimetallic strip for focusing radiant energy transmitted thereto through said tube upon a small intermediate portion of said strip not exceeding the center one-third of said element, thereby to produce a response of said portion of said strip, and supporting means including facilities for clamping the end portions of said strip against both angular and lateral motion, thereby to limit the response of said intermediate strip portion substantially to that effected by the focusing of radiant energy from said source upon said strip portion.

LUDVIK J. KOCI.

REFERENCES CITED

The following references are of record in the file of this patent:

UNITED STATES PATENTS

| Number | Name | Date |
| --- | --- | --- |
| 726,490 | Yerrington | Apr. 28, 1903 |
| 933,543 | Foster | Sept. 7, 1909 |
| 1,318,516 | Wallis et al. | Oct. 14, 1919 |
| 2,162,098 | McCabe | June 13, 1939 |
| 2,162,524 | Brace et al. | June 13, 1939 |
| 2,286,173 | Maxon | June 9, 1942 |
| 2,286,266 | DeLancey | June 16, 1942 |
| 2,332,518 | Koci | Oct. 26, 1943 |
| 2,349,436 | Keeler | May 23, 1944 |

FOREIGN PATENTS

| Number | Country | Date |
| --- | --- | --- |
| 7,585 | France | June 29, 1907 |